US007012256B1

(12) United States Patent
Roos et al.

(10) Patent No.: US 7,012,256 B1
(45) Date of Patent: Mar. 14, 2006

(54) COMPUTER ASSISTED BAG SCREENING SYSTEM

(75) Inventors: Charles E. Roos, Nashville, TN (US); Edward J. Sommer, Jr., Nashville, TN (US)

(73) Assignee: National Recovery Technologies, Inc., Nashville, TN (US)

( * ) Notice: Subject to any disclaimer, the term of this patent is extended or adjusted under 35 U.S.C. 154(b) by 205 days.

(21) Appl. No.: 10/328,328

(22) Filed: Dec. 23, 2002

Related U.S. Application Data

(60) Provisional application No. 60/342,290, filed on Dec. 21, 2001.

(51) Int. Cl.
*G01N 23/04* (2006.01)
(52) U.S. Cl. .................................. 250/359.1; 250/358.1
(58) Field of Classification Search ............. 250/358.1, 250/359.1, 360.1
See application file for complete search history.

(56) References Cited

U.S. PATENT DOCUMENTS 6,707,879 B1 *   3/2004   McClelland et al. .......... 378/57

* cited by examiner

*Primary Examiner*—Constantine Hannaher
(74) *Attorney, Agent, or Firm*—Wyatt, Tarrant & Combs, LLP

(57) ABSTRACT

A method and apparatus are disclosed for screening articles utilizing a computerized touch sensitive screen or other computerized pointing device for operator identification and electronic marking of objects within the article to be further examined. An operator positioned at a computerized touch sensitive screen views electronic images of the articles to be screened as they are conveyed past a sensor array which transmits sequences of images of the series either directly or through a computer to the touch sensitive display screen. The operator manually "touches" objects within the articles displayed on the screen to be identified on coupled interactive screens thereby registering the objects selected within the computer. The computer then provides sequential information identifying actions to be taken and information and data to be recorded.

28 Claims, 8 Drawing Sheets

Supervisory Touch Screen

Touch Screen A                    Touch Screen B

Inspector Touched Here

COMPUTER ASSISTED BAG SCREENING SYSTEM

CROSS REFERENCE TO RELATED APPLICATIONS

This application claims priority of Application Ser. No. 60/342,290 filed Dec. 21, 2001.

STATEMENT REGARDING FEDERALLY SPONSORED RESEARCH OR DEVELOPMENT

None

BACKGROUND OF THE INVENTION

Current bag screening methods at entry points to secure areas in airports and other security sensitive installations are essentially manual systems that take little advantage of today's computerized technologies. Typically, situated at the entry to an airport concourse, for instance, is a security checkpoint station having x-ray machines for inspection of carry-on baggage. An inspector who examines the x-ray images of bags passing through a unit is stationed at each x-ray machine. If an inspector sees a potential threat object he/she typically stops image inspection and verbally alerts search personnel stationed at the end of the x-ray machine conveyor to remove the bag in question to search for the object. Often the search person is called over to the x-ray image monitor to look at the object on the screen to help in the search of the baggage. In the meantime, flow of traffic through the security checkpoint halts while this communication is going on. Lines at these x-ray machines are notoriously long and can be quite slow, especially with today's increased threats of terrorism.

Additionally there are no detailed records kept of people, baggage, and objects passing through security checkpoints in our airports or at other security sensitive installations. With the thousands of people, bags, packages, etc. being screened daily at a checkpoint it is impossible for security personnel to accurately remember and keep track of who or what passed through their checkpoint, even just a few minutes earlier.

The inventors have, in a previous invention, utilized computerized pointer technology, such as a touch screen, to select and define the spatial position of objects selected by an inspector from within a mixture of objects (U.S. Pat. No. 6,124,560). The present invention extends these capabilities to provide not only location of selected objects to a computer but additionally to provide instant electronic communications among security checkpoint personnel of the presence, appearance, and location of selected objects and provides that this information along with the images of the selected objects within their mixture of objects and associated data be electronically stored in a searchable computerized database. The present invention further provides that computerized algorithms can utilize this information to learn the characteristics of selected objects over time so to allow the computer to automatically help in the selection of similar objects.

FIELD OF THE INVENTION

The inventive computer assisted bag screening system provides means for rapid identification of potentially objectionable inclusions within bags, packages, wrappings, or other containers. The use of this technology can rapidly screen such objects with minimal change to existing facilities. The screening system uses computer technology and a touch screen, or other pointing device, that may enable operators to select several objects per minute without stress. The touch screen or pointing device provides an electronic registration within a computer of objects selected by an operator.

Security personnel have high job turnover rates. Bag screeners are often untrained, poorly paid and highly stressed. These screeners are typically expected to inspect up to 12 bags per minute. The repetitive tasks and lack of experienced scanners have caused lapses of attention. There needs to be systematic checks on performance, better training and reduced stress for the bag screeners before it will be feasible to check all of the checked bag as required in the recent law signed by the President.

The innovative imaging and touch screen security and communications system of the present invention can be applied at locations using x-rays or other imaging technology for inspection and screening of objects and people entering into a secure area. It is believed that the system can significantly improve efficiency and increase traffic flow through a security checkpoint, for instance at an airport or other security sensitive installation (such as a power plant, military base, federal building, etc.) by computerizing and streamlining communications between image inspection personnel, bag search personnel, and supervisory personnel. Furthermore, the system will provide a searchable computerized database of all x-ray images, associated data, search alerts and search results for people and objects passing through the security checkpoint. The information in the database will tag x-ray or other type images containing potential threat objects with the actual identities of the objects allowing computerized image processing correlations to be developed to provide computer aided identification of potential threat objects to assist the image inspector. The database will be usable for investigating security lapses and for analyzing activities at a security checkpoint and throughout a local area network linking security checkpoints.

The use of the new computer assisted screening system permits the separation of the image inspection activity from the dirt, noise and confusion of existing security checkpoints. It makes the work of screening less repetitive and the higher productivity permits the payment of higher wages. There is no requirement that image inspectors be in the same location or even the same area of the country as the bags, packages, people, etc. that are being checked. The image inspectors can be assigned in response to the changing traffic loads at different security checkpoints. The remote inspection also provides a means for supervisors to constantly monitor, train and inspect the performance of the bag screeners.

When the image inspecting operator sees any object illuminated by the inventive screening system that merits further attention, the operator touches the object on the touch screen. The bag can then be sent to an area for further inspection, as by being diverted to an alternative conveyor or search area. The results of the search can be entered into a computerized database through touching appropriate identifications on a menu presented on a touch screen to the searcher or by using another type computerized pointing device such as a mouse or light pen with a computer monitor.

The new screening system at airports, power plants, and other restricted locations enables inspectors doing the detailed investigations to have the benefit of seeing all of the touch screen identified suspicious objects highlighted on their monitor screens. The system provides that all image scans, associated data, and screener touch screen responses are saved to a computerized database thereby providing a searchable computerized record of objects, people, etc. passing through security checkpoints and allowing later analysis of activities at security checkpoints.

The new system further enables objects that are identified by a first bag screener to be automatically referred to a supervisor for a second opinion. The supervisor may either clear the bag for loading or the bag can be diverted to a special area for a detailed inspection.

The present invention can make use of artificial intelligence to highlight objects that are similar to those selected by the human operator. After the screener has selected certain objects several times, the computer is able to recognize certain shapes and to highlight them. It is the aim of the screening system to make the job of screening much more productive and to provide a preliminary scan of the large percentage of the baggage that does not need a more detailed inspection.

While the touch screen or other pointing device interface, computer, and artificial intelligence programs in the present invention make bag screening much faster and less stressful, it does not replace the human operator. Additionally it provides a means to monitor the performance of image inspectors and provides a quick way to get a second opinion if any suspicious object is seen. Utilizing remote computerized pointing device monitoring, such as with a touch screen, supervisors may run on-line checks to ensure that the screening operators are providing reliable identification of targeted objects. If the supervisor, viewing the same images as a primary image screener, selects 100 objects and 85 are also found by the primary screener then the relative detection efficiency of the primary screener is 85% or 85/100. An important feature is that the computer, having learned to identify threat objects in images through its artificial intelligence program, can similarly perform a check of image inspector efficiency and automatically report its results. It is a significant feature that measurement of such image inspection efficiency, by a supervisor or by the computer, can also be performed off-line using stored images with stored touch screen responses retrieved from the computerized database of checkpoint activities.

Another significant feature of the invention is that it can be used to monitor and record trainee inspector responses to images presented to them during training. As described above, the efficiency of trainees for image inspection can be measured by the instructor or by the computer. Real images from a database of images from a security checkpoint can be used to train the new inspectors. The new inspectors' responses to these images can be compared to the stored responses of the security personnel manning the security checkpoint in addition to the responses of the trainee instructor. Additionally, computerized images of threat objects can be projected into an image, such as is done by the new "Threat Image Projection System" or TIPS system recently introduced by the FAA for x-ray image inspection personnel testing and training. Interfacing with TIPS, the inspectors' touch screen responses can be monitored for efficiency of detection, both in pre-job training and during on-the-job training and monitoring.

SUMMARY OF THE INVENTION

The system provides essentially instantaneous touch screen communications among security personnel with regard to inspection by x-ray or other type imaging generated at security inspection points. Among the advantages offered by the system are:

Increases throughput at a security inspection station while increasing effectiveness of the inspection process.

Allows a second coincident real-time visual inspection of images by a supervisor or second inspector.

Enables rapid automated communications between image touch screen inspectors and object (i.e. bag) search personnel.

Enables rapid automated communications between supervisory personnel and image touch screen inspectors and object search personnel.

Provides rapid automated feedback to inspection and supervisory personnel from search personnel as to status of a bag search.

Provides electronic registration of location and appearance of selected objects allowing storage of images with associated data.

Provides a searchable computerized record of inspection station activity.

Provides for a computer to utilize algorithms to learn the characteristics of selected objects over time enabling the computer to automatically help in the selection of similar objects.

Provides computerized methods to measure the detection efficiency of image inspectors.

Provides a training tool for security personnel.

DETAILED DESCRIPTION OF THE PREFERRED EMBODIMENTS

Figure 1:
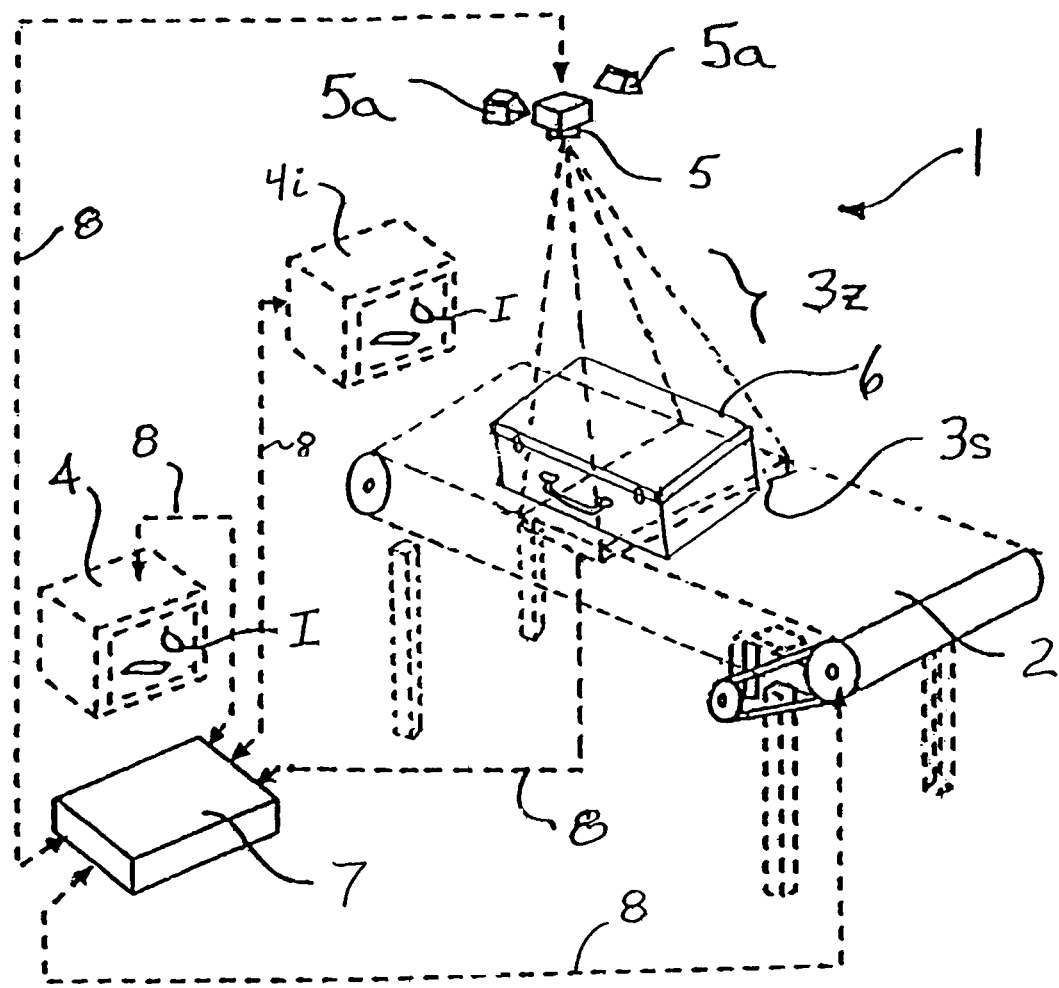
FIG. 1 is a perspective view of a preferred embodiment of the present invention.

Referring now to the drawings and FIG. 1 in particular, a screening system 1 advances one or more articles 6 such as baggage, parcels and mail along a conveyor 2 to be inspected at an inspection zone 3z which is irradiated with electromagnetic radiation from radiation source 5. In the illustrated embodiment the preferred source for irradiation is an x-ray tube (i.e., x-ray radiation), however other suitable radiation sources 5 can include, for example, Klystron tube (microwave radiation), UV lamp (ultraviolet radiation), IR lamp (infrared radiation), and Radio-Nuclide source (gamma rays). The conveyor 2 may be a belt conveyor, a slide, a vibrating pan conveyor, a free fall trajectory, or any other means for conveying materials as is effective for transferring the article 6 through the inspection zone 3z. A radiation sensor array 3s (for the x-ray receiver incorporated in high precision bag x-ray inspection systems currently available), is positioned to view the inspection zone 3z so to provide data arrays corresponding to measurements of electromagnetic radiation emanating from inspection zone 3z and from any article 6 being conveyed through the inspection zone 3z. The electromagnetic radiation emanating from articles 6 in the illustrated embodiment are x-rays, which are projected and detected by sensor array 3s, the output of which is supplied to computer processing unit 7. In alternative embodiments, the detected radiation may be reflected radiation, radiation transmitted through articles 6, radiation emitted from articles 6 through fluorescence, or any other forms of radiation resulting from interaction of articles 6 (or objects within the articles) with the incident radiation from sources 5. The choice of irradiation is dependent upon the material characteristics of the article and objects of interest and which type of radiation is responsive to such characteristics. Sensor array 3s is shown positioned below the conveyor 2 although in practice it may be located at any position required by the type of radiation and to give the desired view. Sensor array 3s is selected to be sensitive in the wavelength range of x-ray electromagnetic radiation transiting from articles 6 within the inspection zone 3z when irradiated by sources 5. In the present embodiment utilizing x-rays, a single source 5 is sufficient however other types of radiation may require the single source 5 or multiple sources 5a. The geometry of sensor array 3s is determined by the application (herein x-rays for bag screening). For instance the sensor array 3s may be a linear array of sensors or any area array of sensors. It may physically span the full width and/or length of the inspection zone 3z or it may be more compact and use optics to scan the width and/or length of the inspection zone 3z such as with a CCD camera. Sensor array 3s may be positioned on the same side of the inspection zone 3z as is irradiation sources 5, or it may be positioned on the opposite side of inspection zone 3z from sources 5 or positioned at any other location with respect to irradiation sources 5 and inspection zone 3z. The effective wavelength ranges of sensor array 3s and sources 5a may each be in any one of the microwave wavelength range, the ultraviolet wavelength range, the visible light wavelength range, the infrared wavelength range, the x-ray wavelength range, or the gamma ray wavelength range or any combination thereof. Sensor array 3s may be fitted with special filters which allow only certain wavelengths of electromagnetic radiation to reach sensor array 3s for measurement.

In the present embodiment, sensor array 3s data corresponding to electromagnetic x-ray measurements emanating from the inspection zone 3z and from articles 6 within the inspection zone 3z are transmitted from sensor array 3s to computer 7 and/or touch sensitive screen 4 over transmitting cables 8 or by wireless means. Control of sensor array 3s operation may also be provided by computer 7 over transmitting cables 8 or by wireless transmission. Sensor array 3s data received by computer 7 are processed for analog to digital conversion if not already digital by nature of sensor array 3s and micro-computer processed into digitized electronic images which are transmitted over cables 8 to touch sensitive screen 4 which is capable of electronically registering the coordinates on the screen of a manual touch by a human operator. Touch screen 4 displays the digitized images corresponding to the sensor data from sensor array 3s of the inspection zone 3z and the articles 6 to be screened within the inspection zone 3z. Alternatively, the sensor array 3s can transmit the images directly to the touch sensitive screen 4.

The human operator (i.e., Inspector, Supervisor, etc.) views the electronic images on touch screen 4 and manually touches the image of any significant material object within an article 6 being inspected, in this case object image 1, which the operator wishes to be identified for further action, such as direct visual inspection, which may require the article 6 to be removed from the stream of articles 6 on conveyor 2. Preselected categories of significant information, such as spatial coordinates describing the location, prior identifications of similar articles or a highlight of the object on the touch sensitive screen 4 of the touch by operator may be registered by touch sensitive screen 4 and transmitted over cables 8 to computer 7. Computer 7 associates the touch screen information of the registered touch with corresponding information in the computer 7 and further associates the information on other touch screens 4i or other computer monitors in the system. Computer 7 then electronically tracks the location of selected article 6 as it is further conveyed along conveyor 2 (as to other connected conveyors for further inspection).

Computer 7 may contain a pre-compiled pattern database or identification and pattern recognition algorithms which can perform learning of selections by an operator as the operator makes the selections. Such identification and pattern recognition algorithms may be accomplished by computerized neural networks or other such pattern recognition computer code. Identification by pattern recognition of the objects can be performed by using, for example, the edge enhancement and image contour extraction techniques. Further details of pattern recognition and its interaction with robotic systems is described in the published text titled "Robot Vision," Berthold Klaus Paul Horn, MIT Press, Cambridge, Mass. (1991), the disclosure of which is incorporated herein, in its entirety.

Learning the recognized object patterns can be performed using known neural network or other pattern recognition and learning systems. Neural network techniques for identifying and learning patterns are described in, for example, the published text "Neural Networks for Pattern Recognition," Christopher M. Bishop, Oxford University Press, New York (1995), (hereafter "Bishop"), the disclosure of which is incorporated herein, in its entirety. Bishop chapters 3–6 describe neural network techniques including single and multiple layer perception as well as different error functions that can be used for training neural networks. Bishop, chapters 9 and 10 describe techniques for learning and generalization in a neural network. Such computerized learning systems are sometimes referred to as artificial intelligence systems.

In this case an operator will initially make touch screen selections of suspicious objects within a mixture in a package or bag to be further examined. As the operator makes selections, the associated electronic images will be processed through the computer algorithms with the imaging patterns distinctive to the selected objects noted by the algorithms. As similar objects are repetitively selected by the operator the computer algorithms associate the distinctive properties of the imaging patterns with objects to be selected for extraction and begin to electronically select similar patterns for extraction without input from the human operator. In this way the computerized system learns those objects to be further examined or diverted and after sufficient learning experience may be able to perform certain screening without input from the operator.

The choice of using a touch screen 4 for making the selection of objects 1 to be further examined or extracted from the mixture is a matter of preference. Similar pointing devices interfaced to a display screen could be used such as a computer mouse, a track ball, a joystick, a touch pad, a light pen, or other such device. The inventors have chosen the touch screen 4 as the preferred pointing device based upon their intensive studies of some of these various types of devices for screening applications.

Figure 2:
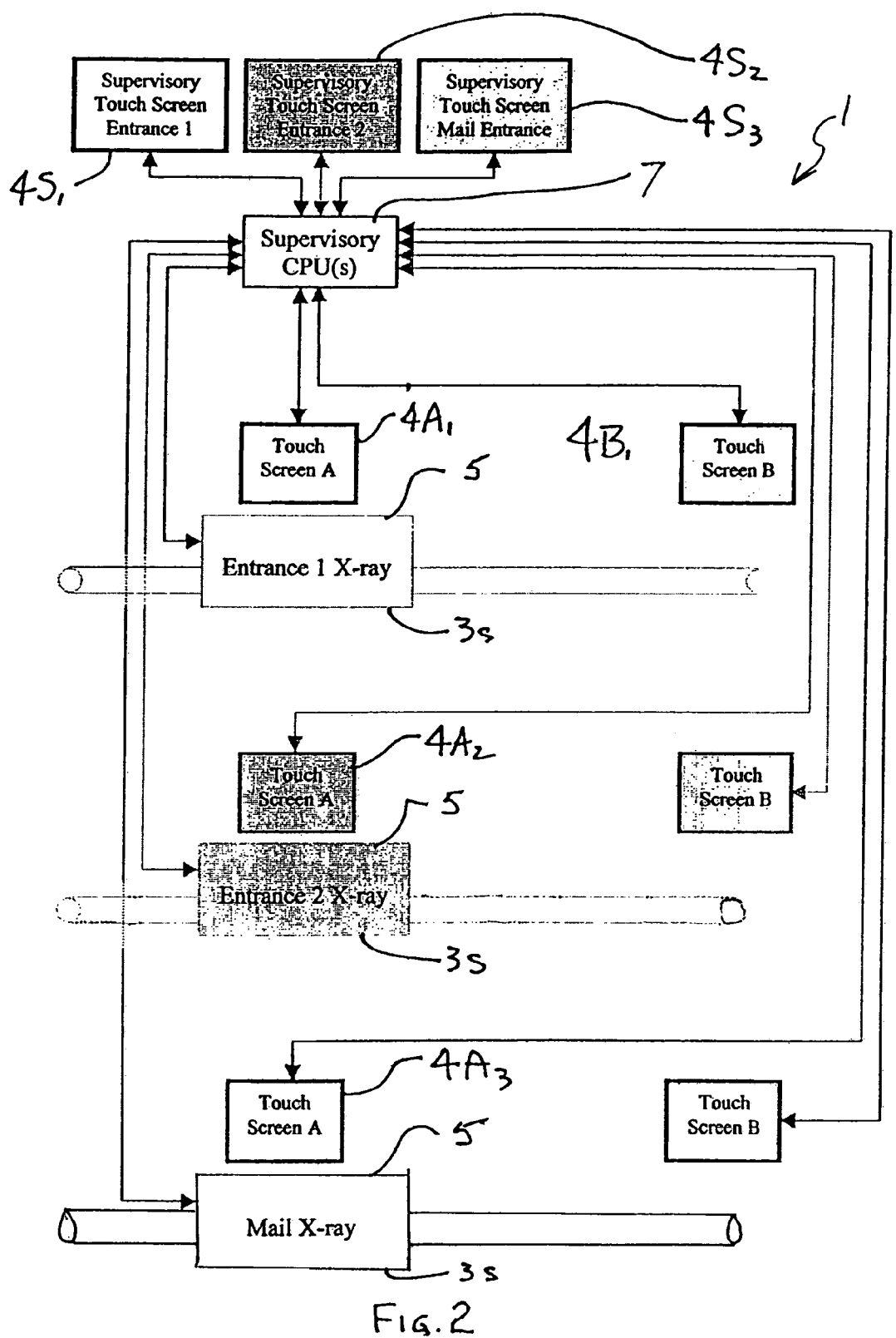
FIG. 2 is a block diagram showing the interactive screens and screening apparatus of the present invention.

FIG. 2 illustrates a bag screening system 1 with multiple security checkpoints for a building site such as a public building being any structure from a courthouse to an airport. The system 1 incorporates a computer processing unit 7 connected to a plurality of screening units 3s, which in the illustrated embodiment is a conventional bag x-ray system. Alternative or additional screening units based on other energy levels/frequencies may be incorporated to take advantage of transmission, reflection or absorption of such energies by particular materials for which the screening is intended. In the present embodiment, an article 6 of baggage, mail or the like is placed on a conveyor 2 to transit the screening area (irradiation zone of the x-ray) and the image of the transiting article 6 is displayed on screens 4.

Figure 3:
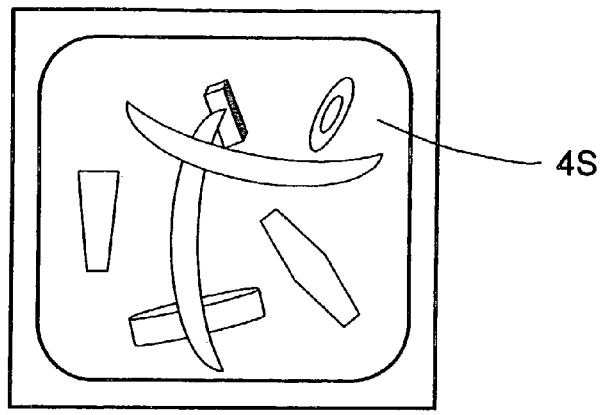
FIG. 3 is a pictorial view of interactive screens of the apparatus of the invention.
Figure 3:
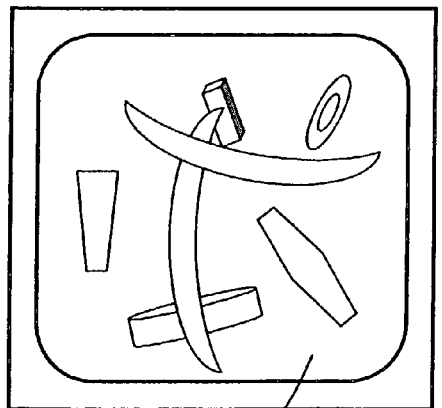
Figure 3:
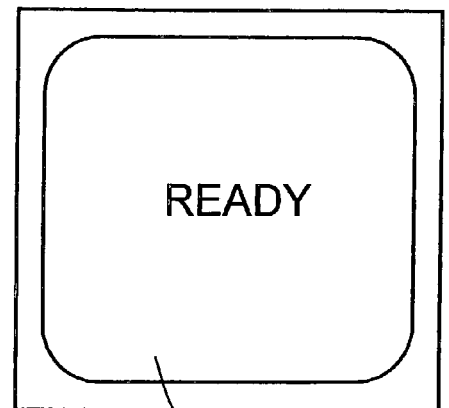

The screens of FIG. 3 show the status of the touch screens 4 as an x-ray image of an article of baggage 6 is first displayed. If there are no regions of interest (ROI's) found by the inspector at Touch Screen 4A (as perhaps located at the initial inspection site, whether at a security area on an airport concourse or in a remote location in the bag handling area such as prior to aircraft loading) or by the Supervisor at the Supervisory Touch Screen 4S, then the status of the touch screens 4 remain unchanged until the bag 6 passes out of the x-ray machine 3 and a new article of baggage 6 is introduced.

Figure 4:
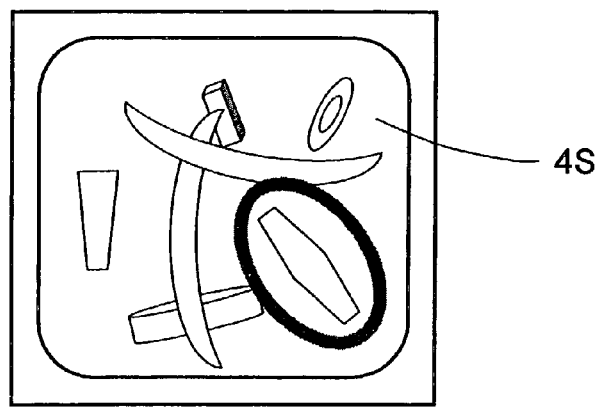
FIG. 4 is a pictorial view of a second view of interactive screens of the apparatus of the invention.
Figure 4:
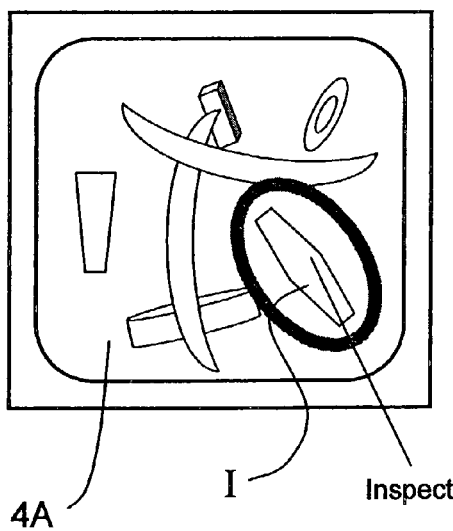
Figure 4:
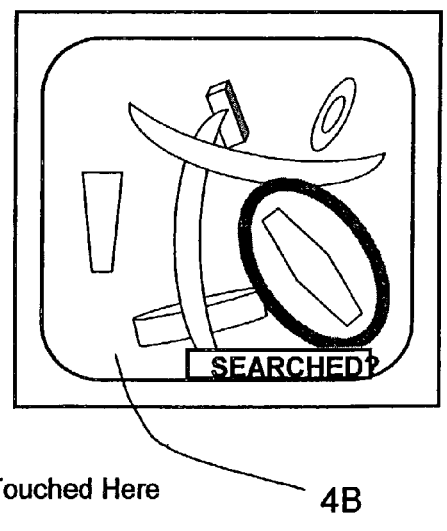

FIG. 4 illustrates the operation of the screening system 1 after an Inspector at Touch Screen 4A touches a suspicious object 1 on the screen. An identifying circle C marks the region of interest on screen 4A and the image is repeated on screens 4B and 4S. The image on Touch Screen 4B remains on the screen as a guide for continued searching until the bag 6 in question is opened, searched or otherwise evaluated and the suspicious object 1 is determined to be acceptable or non-acceptable cargo. An commercial bag/luggage tracking system, as already known to those skilled in the art however, integrated to include the scanning capabilities of the present invention, insures that the appropriate baggage article 6 which requires further search is extracted from the baggage flow, as by being diverted to a dedicated conveyor, and thereby preventing continuation through the system to cargo loading.

Figure 5:
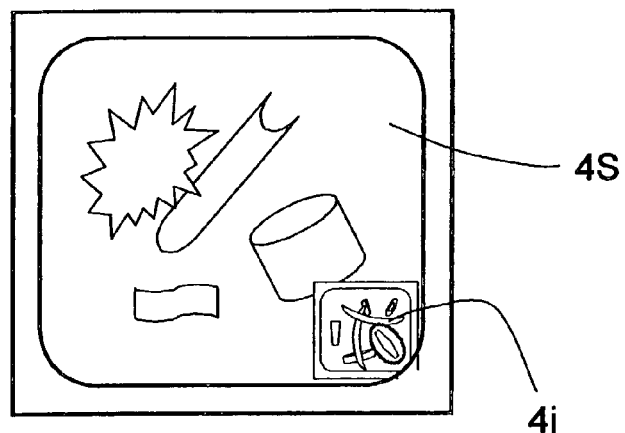
FIG. 5 is a pictorial view of a third view of interactive screens of the apparatus of the invention.
Figure 5:
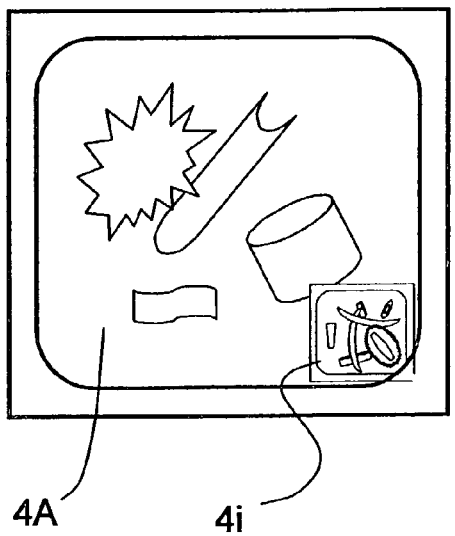
Figure 5:
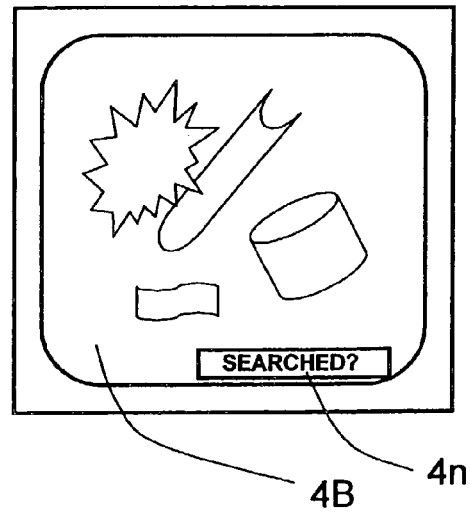
Figure 6:
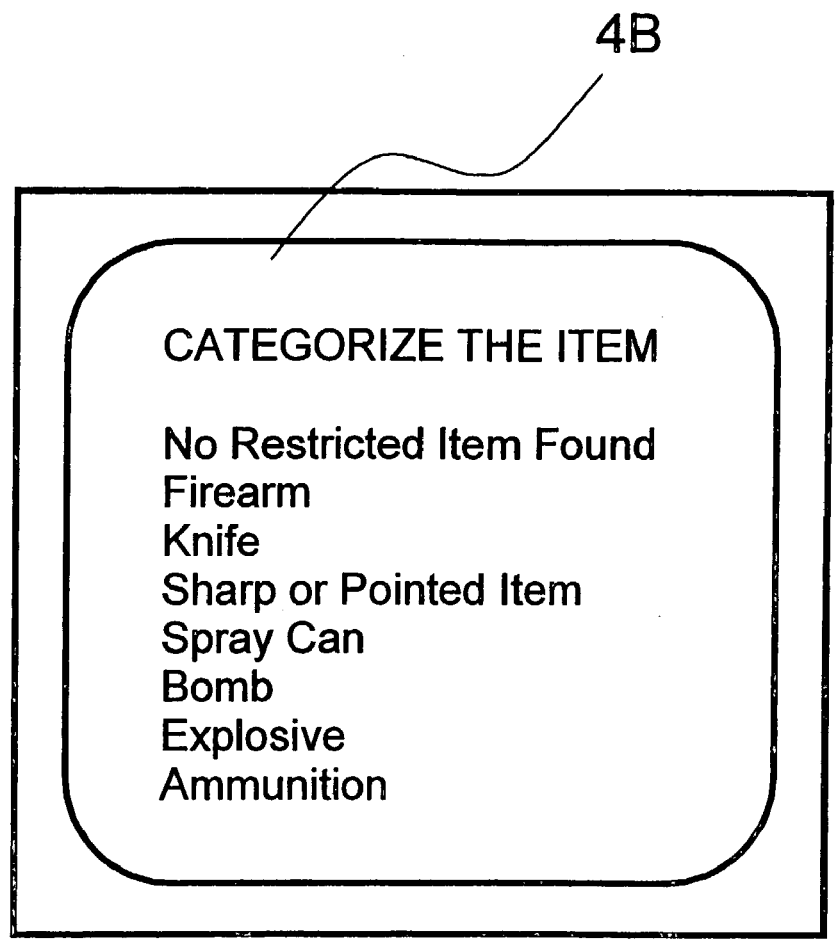
FIG. 6 is a pictorial view of a particular interactive screens of the apparatus of the invention.

In the meantime while the contaminated baggage article is rerouted for further examination, FIG. 5 illustrates the continued flow of additional baggage articles through the x-ray system for inspection. Noteworthy is that the method of the present invention that Touch Screen 4A and the Supervisory Touch screen 4S show the image of the current article of bag 6 transiting the system while also showing a smaller inset screen 4i until the previously identified contaminated baggage article has been cleared. Touch Screen 4B continues to hold the image of the contaminated baggage article until the article is opened, searched, evaluated and the suspicious object is identified as acceptable or non-acceptable cargo. In keeping with the inventive method, Touch Screen 4B displays an insert note 4n with the message "Searched?", which is maintained until the article of baggage has been processed and a determination made of its acceptability. Once the bag article is cleared at the station having Touch Screen 4B, and the message "Searched?" is touched, the screens 4 revert to the image of the currently viewed article, and the inset images 4i disappear. Touch Screen 4B may alternatively be provided with a Categorization Screen as is illustrated in FIG. 6.

With the categorization method included, the present system may incorporate the evaluation or categorization of the noted object I. In the present embodiment, the following evaluations may be made: NO RESTRICTED Object FOUND; FIREARM; KNIFE; SHARP, POINTED Object; SPRAY CAN; BOMB; EXPLOSIVE; AMMUNITION. Other designations may be added or substituted without departing from the scope of the present invention. When the evaluation is made, it may be entered by merely touching the appropriate line (as is well known in the art) and that evaluation maybe stored in the computer 7 which provides the overall control of system components and compilation and exercise of data received and output. The intent of the system is to digitize and store in a database all x-ray images and all regions of interest (ROI's) marked via the touch screen including those not selected on a touch screen for search. The images are all date and time stamped and identified as to the individual security station (e.g., on a concourse or in a bag handling area). Additionally, corresponding digitized photographic images of the articles, digitized photographic images of the person who presented the bag or articles for inspection, and other pertinent information may also be stored along with the digitized x-ray images. This procedure provides a searchable history of all articles and people carrying the articles entered into the system, touch screen inspector responses, and search results should review be needed at any time for verification of security.

The database of images and corresponding identification information entered provides a capability for processing the data to compile correlations, associations, and histories of objects and individuals connected thereto, entering a particular secure premises through the system. As should be understood, the body of collected information may be used in investigative issues and for predictive purposes. Additionally, having digitized images allows the application of image processing which can be used for computerized examination of images for identification of suspicious objects. This may assist the visual inspection of the images by security personnel. It is a collateral use of the inventive system to be a learning/teaching tool enabling human inspectors to identify suspicious objects to the system through the touch screen interface as the system "learns" the characteristics of particular objects and itself alerts the human inspectors to non-acceptable objects.

Figure 7:
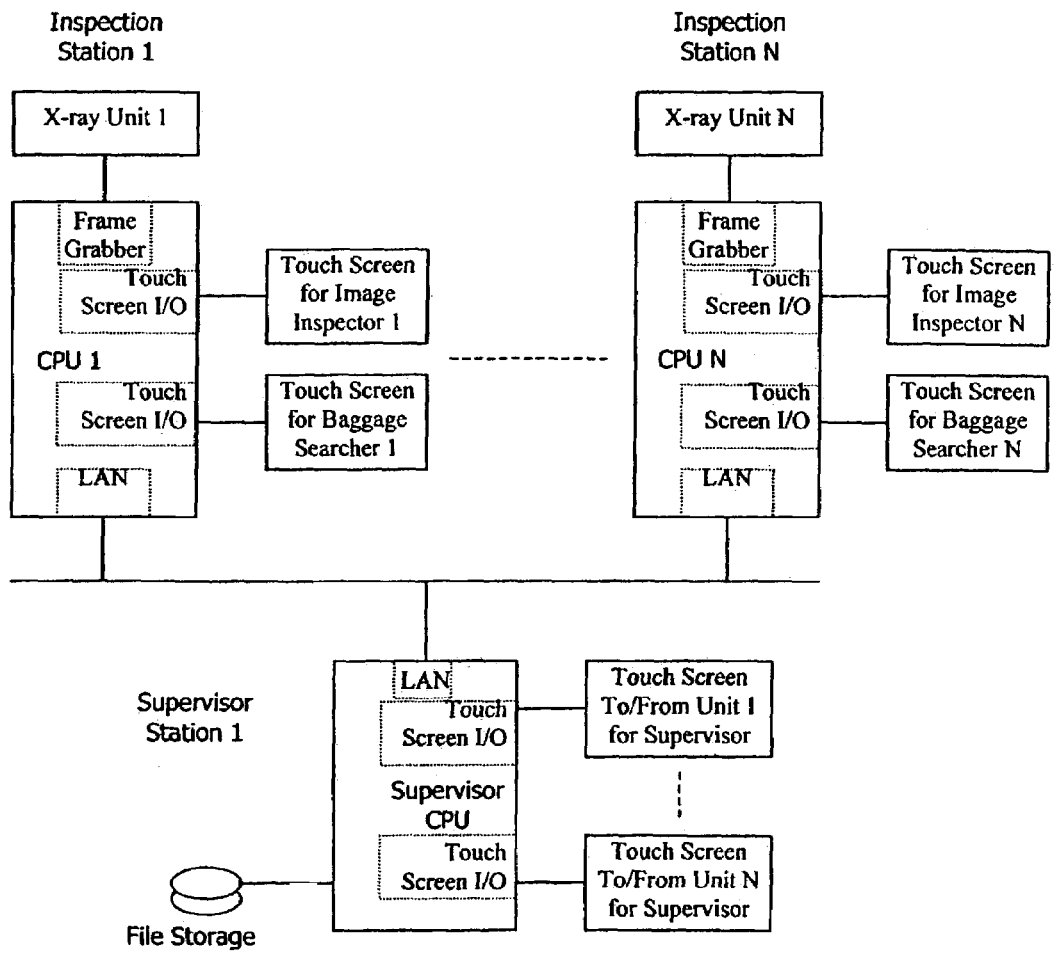
FIG. 7 is a block diagram of inspection stations and the interactive apparatus for multiline screening of articles according to the invention.

FIG. 7 illustrates the hardware interconnection of multiple scanners according to the present invention. There can be as many Inspection Stations and Supervisor Stations on the local area network (LAN) as is desired. The LAN can be within one installation, such as an airport or public building, or over a wide area such as being distributed over a geographic region, such as a state or country. In the context of the single or multiple area disposition, a Supervisor Station may become an Image Inspection Station, wherein image inspection takes place remotely from the entrance station (as with the screening station at the security check point at an airport). In that case, the Image Inspector 1 may be located at Supervisor Station 1 (which now becomes an inspection station) with another Supervisor Station located on the LAN which will provide supervisory functions. In such an embodiment, the Touch Screen for Image Inspector 1 is unmanned.

Figure 8:
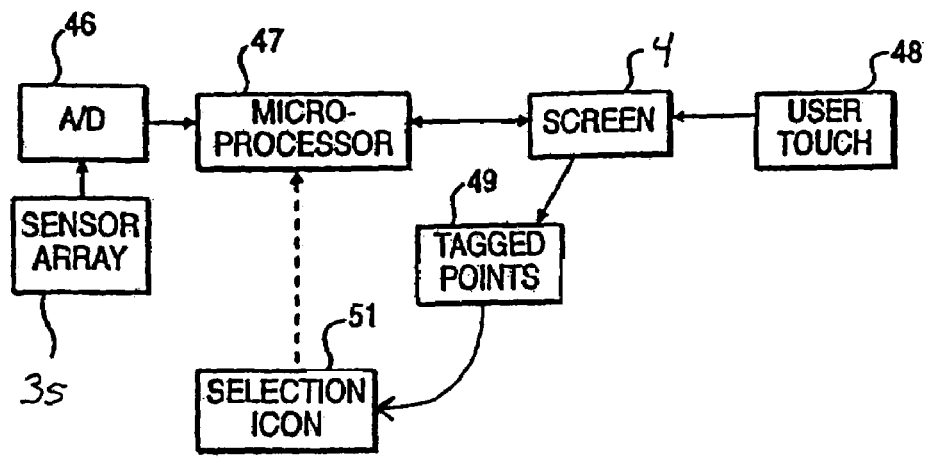
FIG. 8 is a block diagram showing the software interfaces of the apparatus of the invention.

FIG. 8 shows a block diagram of software interfaces for implementing the preferred embodiment of the invention depicted in FIG. 1. In FIG. 8 the sensor array 3s sends data through A/D converter 46 to microprocessor 47. Human operator touches 48 the touch sensitive screen 4 on the displayed image to identify an object 1 (FIG. 4) for further examination. This input to touch sensitive screen 4 is tagged 49 by microprocessor 47 as a selection icon 51 in microprocessor 47 host memory and on touch screen 4. The object is further identified on associated touch screens such as 4A, 4B and 4S. Depending upon the implemented embodiment, additional sub routines for identification and data storage may be implemented into and by the computer 7, such as those described in connection with FIG. 6.

Figure 9:
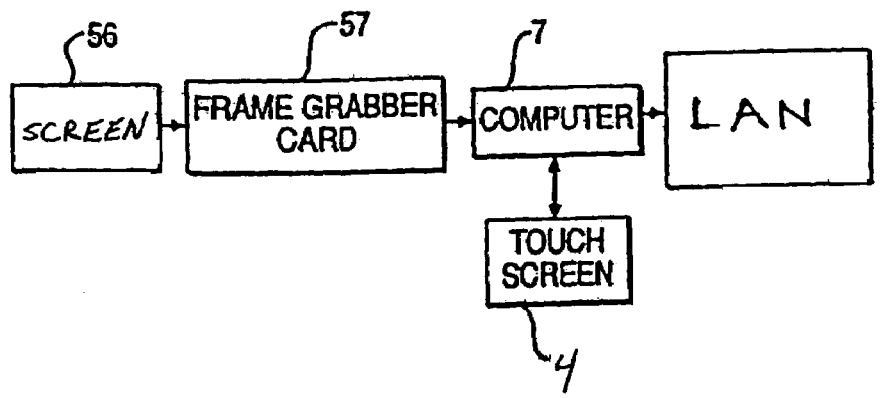
FIG. 9 is a block diagram showing the hardware components of the software interfaces of FIG. 8.

FIG. 9 shows a block diagram of a hardware implementation for the preferred embodiment of FIGS. 1 and 8. In this case an x-ray screen 56 is used to display images derived from sensor array 3s (FIGS. 1 and 8) and interfaces to computer 7 (which incorporates microprocessor 47) through a frame grabber card 57. Images from the x-ray screen 56 are displayed as digitized or analog electronic images on the touch screen 4. User touch input 48 (FIG. 8) is sent back to computer 7 and processed in conjunction with the electronic images and those additional steps of identification and sequencing as are described and illustrated in connection with FIGS. 2 though 7.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A method for inspecting a series of articles containing discrete objects to select for further examination discernable objects in articles within the series comprising steps of:
   (a) conveying a series of articles containing discrete objects into and through an inspection zone;
   (b) irradiating said series of articles containing discrete objects with incident electromagnetic radiation while in said inspection zone;
   (c) measuring the electromagnetic radiation emanating from an article within said irradiated series of articles containing discrete objects;
   (d) processing said measured electromagnetic radiation to produce one or more electronic images of irradiated articles within said irradiated series of articles containing discrete objects and presenting said electronic images for visual display;
   (e) interactively selecting, from said visual display, one or more discrete objects discernable within the images of an article within said series of articles containing the one or more discrete objects; and
   (f) displaying said selections on additional displays of said images of said series of articles containing discrete objects.

2. The method of claim 1 wherein said selections of discrete objects are visually marked on an image of an article within said series of articles containing discrete objects presented on said displays.

3. The method of claim 1 wherein said selections are electronically registered within a computer.

4. The method of claim 3 wherein said selections of objects are stored in a searchable database of a computer along with said electronic images of the articles said series of articles containing discrete objects.

5. The method according to claim 4 wherein said selections along with said electronic images of the articles within said series of articles containing discrete objects are stored in a searchable database along with digitized photographic image of an individual associated with an article within said series of articles containing discrete objects.

6. The method according to claim 5 wherein said selections, electronic images, and digitized photographic images are stored in a computer searchable database along with other information associated with said series and said individuals.

7. The method according to claim 6 where said searchable database is analyzed to compile correlations, associations, and histories of objects and individuals related thereto, entering a particular secure premises.

8. The method according to claim 4 where said searchable database is analyzed to compile correlations, associations, and histories of objects and individuals related thereto, entering a particular secure premises.

9. The method according to claim 5 where said searchable database is analyzed to compile correlations, associations, and histories of objects and individuals related thereto, entering a particular secure premises.

10. The method of claim 3 wherein said electronically registered selections of objects are processed by computer algorithms such that the algorithms learn over time the characteristics of similar selected objects.

11. The method of claim 10 wherein said algorithms utilize said learned characteristics to perform computerized selection of similar objects.

12. The method of claim 1 wherein said selecting of objects takes place on a visual display at a location remote from the location where said irradiating occurs.

13. A method for inspecting a series of articles containing discrete objects and selecting for further examination discernable objects in articles within the series of articles comprising steps of:
   (a) conveying a series of articles containing discrete objects into and through an inspection zone;
   (b) irradiating said series of articles containing discrete objects with incident electromagnetic radiation while in said inspection zone;
   (c) measuring the electromagnetic radiation emanating from an article within said irradiated series of articles containing discrete objects;
   (d) processing said measured electromagnetic radiation to produce one or more electronic images of irradiated articles within said irradiated series of articles containing discrete objects and presenting an electronic image of an article as two separate identical visual displays;
   (e) first interactively selecting, from a first visual display, first selected objects discernable within the images of an article within said series of articles containing discrete objects;
   (f) second interactively selecting, from a second visual display, second selected objects discernable within the images of said series of articles containing discrete objects; and
   (g) comparing the images of said first selected objects with the images of said second selected objects to determine relative efficiencies of said first interactively selecting and said second interactively selecting.

14. The method according to claim 13 wherein said second visual display is located remotely from said first visual display.

15. A method for inspecting a series of articles containing discrete objects and selecting for further examination discernable objects within articles within the series of articles comprising steps of:
  (a) conveying a series of articles containing discrete objects into and through an inspection zone;
  (b) irradiating said series of articles containing discrete objects with incident electromagnetic radiation while in said inspection zone;
  (c) measuring the electromagnetic radiation emanating from an article within said irradiated series of articles containing discrete objects;
  (d) processing said measured electromagnetic radiation to produce one or more electronic images of said irradiated series of articles containing discrete objects and presenting said electronic images for visual display;
  (e) first interactively selecting, from said visual display, selected objects discernable within the images of an article within said series of articles containing discrete objects;
  (f) electronically registering said selected objects within a computer;
  (g) applying computerized algorithms which have learned characteristics of prior interactively selected objects to process said electronic images and make computerized selections of objects displaying characteristics of prior interactively selected objects;
  (h) comparing said electronically registered first interactively selected objects to said computerized selections of objects to determine relative efficiency of said first interactively selecting to the computerized selecting.

16. An apparatus for inspecting a series of articles containing discrete objects to select for further examination discernable objects in articles within the series comprising:
  (a) a conveyor for conveying a series of articles containing discrete objects into and through an inspection zone;
  (b) an electromagnetic radiation source that irradiates said series of articles containing discrete objects within said inspection zone with incident electromagnetic radiation;
  (c) a sensor that examines said series of articles containing discrete objects within said inspection zone and measures electromagnetic radiation emanating from an article within said series of articles containing discrete objects;
  (d) a computer that processes said measured electromagnetic radiation to produce electronic images of irradiated articles within said irradiated series of articles containing discrete objects as they pass through said inspection zone and a display coupled to said computer that presents a visual display of said electronic images; and
  (e) a human operator interface to said visual display such that an operator may interactively select from said images selected objects in articles to be further examined; and
  (f) means for transmitting said images with said interactive selections to additional visual displays.

17. The apparatus of claim 16 wherein said selections are visually marked on the images of an article within said series of articles containing discrete objects presented on said displays.

18. The apparatus of claim 16 wherein said selections are electronically registered within a computer.

19. The apparatus of claim 18 wherein said selections of discrete objects are stored in a searchable database in said computer along with said electronic images of articles within said series of articles containing discrete objects.

20. The apparatus of claim 18 wherein said electronically registered selections are processed by computer algorithms that learn over time the characteristics of similar selected objects.

21. The apparatus of claim 20 wherein said algorithms utilize said learned characteristics to perform computerized selection of similar objects in articles of a subsequent series of articles inspected.

22. The apparatus of claim 16 wherein said human operator interface and said visual display is located remote from said inspection zone.

23. Apparatus for inspecting a series of articles containing discrete objects and selecting for further examination discernable objects in articles within the series comprising:
  (a) a conveyor that conveys a series of articles containing discrete objects into and through an inspection zone;
  (b) an electromagnetic radiation source that irradiates said series of articles containing discrete objects within said inspection zone with incident electromagnetic radiation;
  (c) a sensor that examines said series of articles containing discrete objects within said inspection zone and measures electromagnetic radiation emanating from an article within said series of articles containing discrete objects;
  (d) a microprocessor that processes said measured electromagnetic radiation to produce electronic images of an article within said irradiated series of articles containing discrete objects as they pass through said inspection zone and two separate displays coupled to said microprocessor that present identical visual displays of said electronic images;
  (e) a human operator interface to each of said visual displays such that an operator positioned at each display may interactively select from said images discrete objects to be further examined; and
  (f) means to compare objects selected at each of the two visual displays to determine relative selection efficiencies of operators utilizing the said interface at each display to select objects to be further examined.

24. The apparatus of claim 23 wherein said second visual display is located remotely from said first visual display.

25. Apparatus for inspecting a series of articles containing discrete objects and selecting for further examination discernable objects within the series comprising:
  (a) a conveyor that conveys a series of articles containing discrete objects into and through an inspection zone;
  (b) an electromagnetic radiation source that irradiates said series of articles containing discrete objects within said inspection zone with incident electromagnetic radiation;
  (c) a sensor that examines said series of articles containing discrete objects within said inspection zone and measures electromagnetic radiation emanating from an article within said series of articles containing discrete objects;
  (d) a microprocessor that processes said measured electromagnetic radiation to produce electronic images of an article within said irradiated series of articles containing discrete objects as they pass through said inspection zone and a display coupled to said microprocessor that presents a visual display of said electronic images;

(e) a human operator interface to said visual display such that an operator may interactively select from said images selected objects to be further examined;

(f) a computer for electronically registering said selected objects, (g) computerized algorithms which can learn characteristics of prior interactively selected objects to process said electronic images and make computerized selections of discrete objects displaying characteristics of prior interactively selected objects; and (h) means to compare said electronically registered first interactively selected discrete objects to said computerized selections of objects to determine relative efficiency of said human operator selecting to the computerized selecting.

26. The apparatus of claim 25 wherein said selections along with said electronic images of said series of articles containing discrete objects are stored in a searchable database along with digitized photographic images of individuals associated with said series of articles containing discrete objects.

27. The apparatus of claim 26 wherein said selections, electronic images, and digitized photographic images are stored in a searchable database along with other information associated with said mixtures and said individuals.

28. The apparatus of claim 26 further comprising means to analyze said searchable database to compile at least one of correlations, associations, and histories of objects and individuals related thereto, entering a particular secure premises.

* * * * *

UNITED STATES PATENT AND TRADEMARK OFFICE
CERTIFICATE OF CORRECTION

| | | |
|---|---|---|
| PATENT NO. | : 7,012,256 B1 | Page 1 of 1 |
| APPLICATION NO. | : 10/328328 | |
| DATED | : March 14, 2006 | |
| INVENTOR(S) | : Charles E. Roos et al. | |

It is certified that error appears in the above-identified patent and that said Letters Patent is hereby corrected as shown below:

Under the Statement Regarding Federally Sponsored Research or Development,

Column 1, line 9 insert:

The development of this technology is being sponsored by the National Science Foundation SBIR Program under award DMI-0232800 and award DMI-0422071.

Signed and Sealed this

Fifteenth Day of May, 2007

JON W. DUDAS
*Director of the United States Patent and Trademark Office*